United States Patent [19]

Street et al.

[11] 3,990,591

[45] Nov. 9, 1976

[54] MULTIPLE FUNCTION NUCLEAR HANDLING APPARATUS

[75] Inventors: Jerald R. Street, Brighton; James M. Reid, Denver, both of Colo.

[73] Assignee: Stearns-Roger Corporation, Glendale, Colo.

[22] Filed: Jan. 31, 1975

[21] Appl. No.: 545,811

[52] U.S. Cl. .............................. 214/87; 214/18 N; 176/30; 176/36 W
[51] Int. Cl.² .................. B66C 17/00; G21C 19/20
[58] Field of Search .............................. 176/30–32, 176/35, 36; 214/18 N, 86 R, 87; 294/86 A; 254/178

[56] References Cited
UNITED STATES PATENTS

| | | | |
|---|---|---|---|
| 2,274,168 | 2/1942 | Scharpenberg | 254/178 |
| 2,901,219 | 8/1959 | Bottje et al. | 254/178 |
| 3,229,960 | 1/1966 | Loomis | 254/178 |
| 3,691,011 | 9/1972 | Kruger et al. | 176/30 |
| 3,713,971 | 1/1973 | Van Santen et al. | 176/30 |
| 3,733,250 | 5/1973 | Van Santen et al. | 176/30 |
| 3,768,668 | 10/1973 | Schukei | 214/18 N |
| 3,856,621 | 10/1974 | Suvanto et al. | 176/30 |
| 3,904,048 | 9/1975 | Van Santen et al. | 176/30 |

*Primary Examiner*—Samuel Feinberg
*Assistant Examiner*—S. A. Cangialosi

[57] ABSTRACT

The apparatus comprises a single mast assembly which accomplishes all of the functions which presently require the use of three handling masts, one for fuel assemblies, one for control rods and other long rods, and one for orifice rods. The assembly, in its preferred form, includes a long primary mast secured at its upper end to a handling bridge to depend vertically therefrom, a much shorter working mast vertically movably mounted within the primary mast, and a control rod grapple shank vertically movably mounted within the working mast and of about the same length. The working mast can be lowered onto a fuel assembly and connected to it by gripper latches to lift the fuel assembly and move it to or from the reactor core or other locations, after raising it within the primary mast for protection. The grapple shank can be lowered within the working mast until a grapple at its lower end contacts and connects to the head of a control rod bundle and can then be raised to lift the bundle into the working mast and the working mast into the primary mast for similar transfers. Stops and detents are provided to cause the grapple shank to rise only a short distance within the working mast to house the very short orifice rods and then raise the working mast up within the primary mast. In addition, the grapple shank can be connected to the control rod bundle and the working mast can be connected to the fuel assembly, after which the rods are raised into the working mast and the fuel assembly is raised into the primary mast. After transport, the fuel assembly and the rod bundle can then be set down in different locations.

27 Claims, 12 Drawing Figures

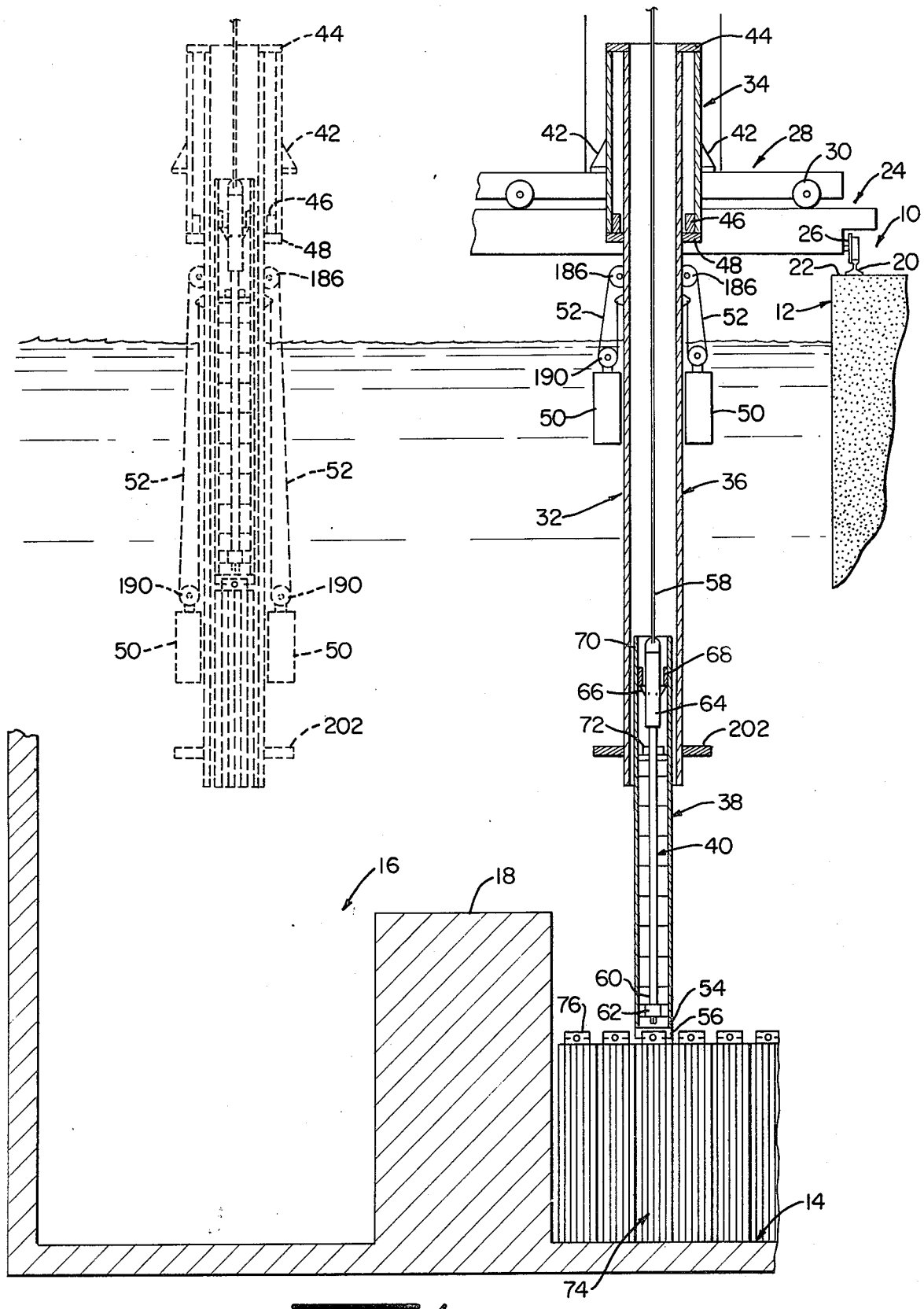

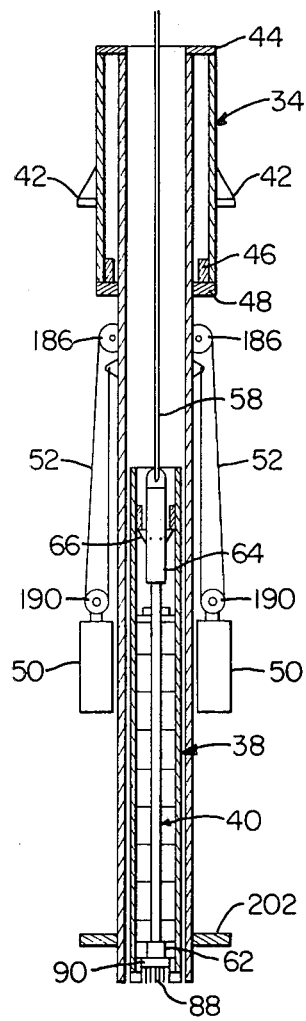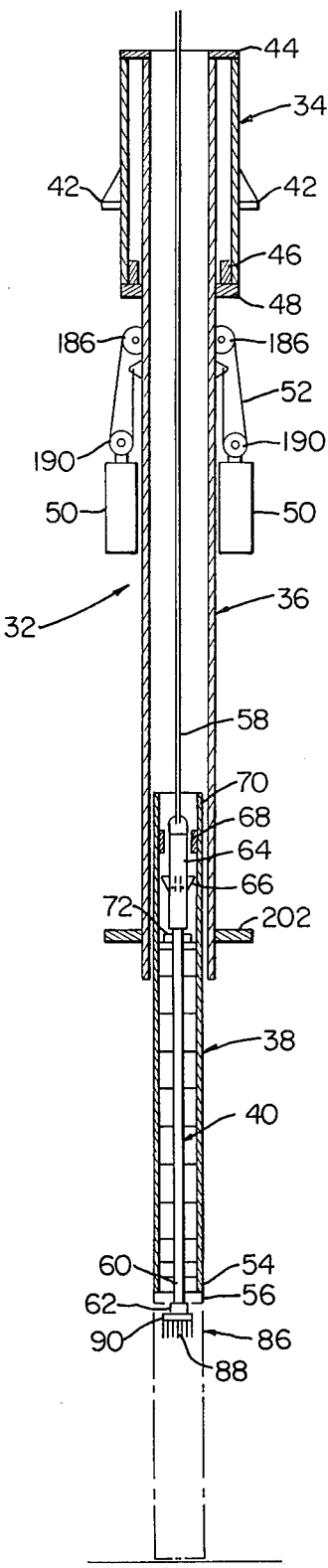

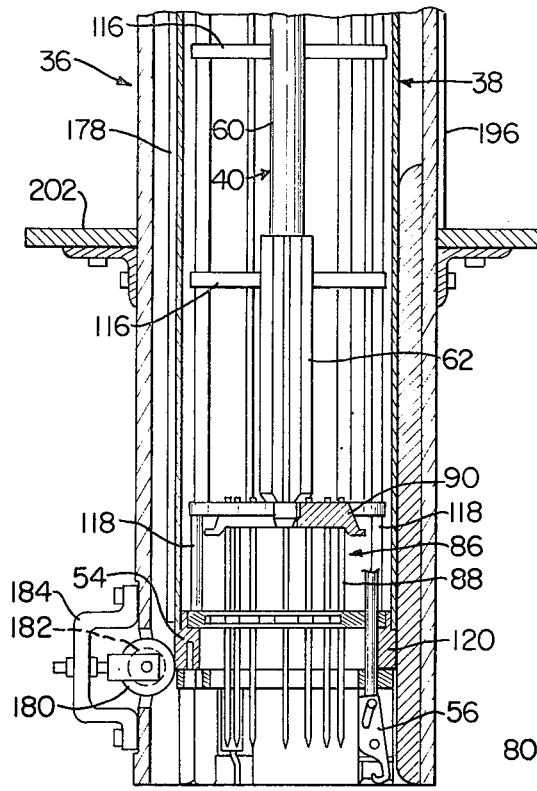
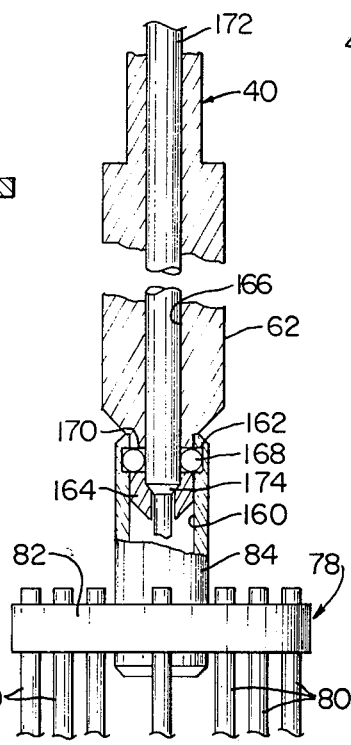
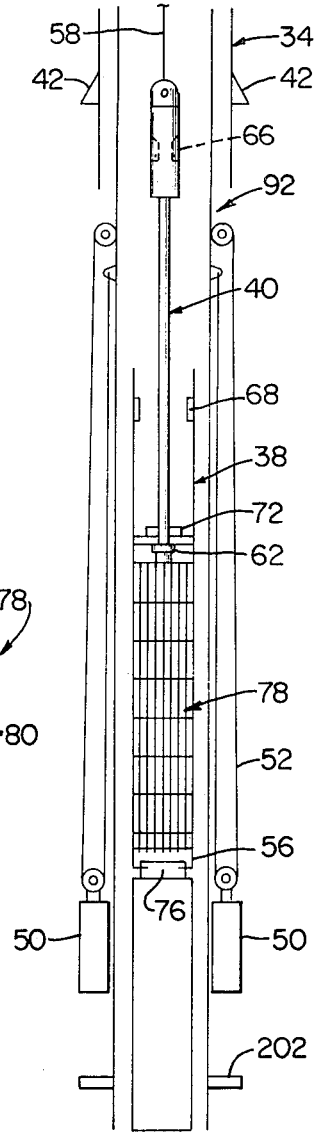
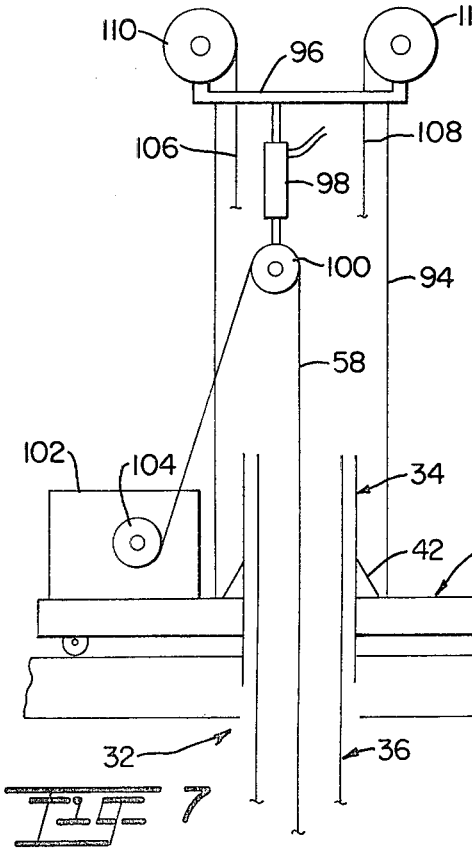
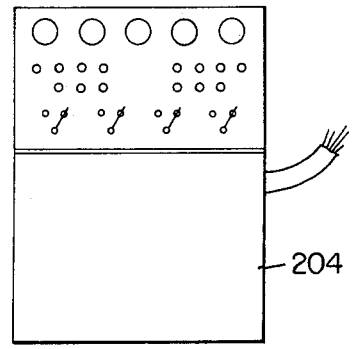

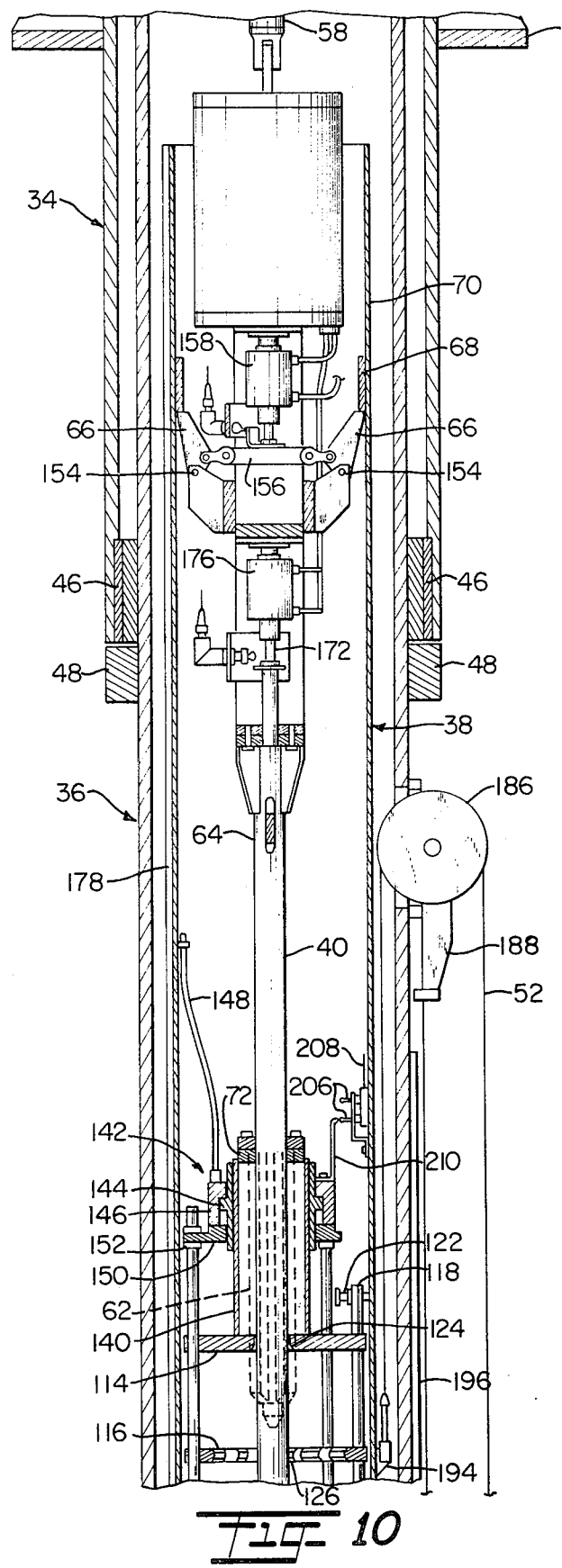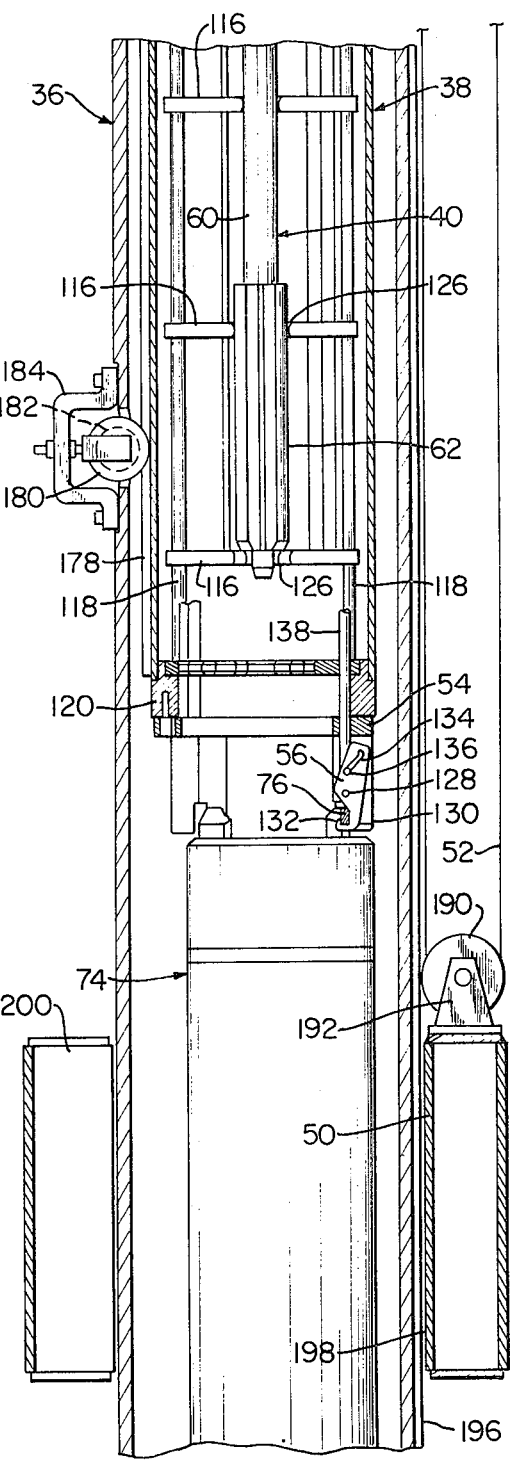

MULTIPLE FUNCTION NUCLEAR HANDLING APPARATUS

BACKGROUND OF THE INVENTION

This invention lies in the field of appparatus for raising, lowering, and transfering nuclear fuel assemblies and accessories. It is directed more particularly to such an apparatus which is constructed and arranged to pick up, transfer, and deposit a fuel assembly, or a control rod bundle, or both, either separately or with the control rods in place in the fuel assembly. It is also directed to such an apparatus which, with the same mechanism, can handle an orifice rod bundle with minimum vertical travel in minimum time.

As is well known, nuclear power reactors include a suitable reactor core and a plurality of fuel assemblies mounted in the core in parlallel vertical juxtaposition. Some portions of some assemblies contain control rods and some contain orifice rods, in each case the rods being secured to a head which enables them to be deposited or removed in a group. On occasion, poison rods and shaping rods are used and are connected to heads in the same general way. The basic control rods, poison rods, and shaping rods are all long, nearly the length of the tube elements of the fuel assemblies, while the orifice rods are very short and have a length which is only a small percentage of the length of the other rods. Since they all exert some controlling function they may all be considered as control rods for the general discussion of the disclosure.

The nuclear fuel located in the lower ends of the fuel assemblies gradually becomes depleted through use. When the fuel is exhausted a fuel assembly is removed from the core and transferred to a storage location where a fresh assembly may be available to replace it or it may be recharged. If the fuel is only partially spent, an assembly may be transferred to a different position in the core. In some cases rod bundles may be replaced or transferred from one assembly to another. In conventional practice, using a standard handling bridge, a separate mast depending from the bridge is used to transfer the fuel assembly, the long rods, and the short rods. This requires a large and cumbersome apparatus, and locating and operating each separate mast consumes a great deal of time. Since there are a large number of fuel assemblies in each core, the time consumed is very great and of course the reactor is out of service during the entire transfer period. Consequently it is highly desirable to make use of any apparatus which will reduce the down time by a substantial extent.

SUMMARY OF THE INVENTION

The apparatus of the present invention overcomes the difficulties mentioned above and provides an overall system which is comparatively simple and highly reliable, and reduces the down time of the reactor to a marked degree.

Generally stated, the apparatus comprises a single mast assembly which performs all of the functions required in transferring and depositing nuclear fuel assemblies and their accessories. The basic assembly includes a primary mast, a working mast, and a fuel rod grapple shank, all arranged in vertical attitude below a handling bridge, with the upper end of the primary mast being connected to the bridge. The masts may be any type of suitable structure such as beams, channels and the like, and the masts and shank may be coaxially arranged or in parallel lateral juxtaposition. However, the preferred construction consists of masts formed of rigid substantially cylindrical tubes, the working mast being located within the primary mast, supported thereby in coaxial relation, and vertially movable therein. The control rod grapple shank is located coaxially within the working mast and vertically movable therein. A suitable motor and winch on the bridge are connected to and operate a cable connected at one end to the grapple shank to raise and lower it. In order to measure and indicate loads, the hositing cable passes over a cable sheave suspended from a load indicating device on the bridge between the winch and the shank and measures the tension load in the cable produced by the shank.

Control rod guide means are mounted within the working mast and comprise a plurality of vertically spaced horizontally disposed plates secured to each other and to the mast and the plates are apertured to guide the control rod head and the rods attached thereto as they are raised up out of a fuel assembly and into the interior of the mast for transport.

The lower end of the working mast carries a plurality of peripherally spaced pivoted gripper latches actuated by a servo motor in the upper portion of the mast to engage or disengage attachments on the upper end of a fuel assembly for raising, transporting, and lowering the assembly. The lower end of the grapple shank is provided with a grapple operated by a servo motor near the upper end of the shank to engage or disengage the control rod head for raising, transporting, and lowering the control rod bundle.

In order to accomplish the various functions mentioned above, the working mast is provided with fixed detent means at its upper end and the grapple shank is provided with movable latch means at its upper end. When the latch means extend to engage the detent means, raising of the shank will raise the mast in unison with it and in substantially coextensive relation. This arrangement is used when the mast is connected to the fuel assembly, and the joint movement raises the fuel assembly into the primary mast for protection during transport.

In addition, the mast is provided with stop means in its upper portion below the detent means, preferably at the top of the control rod guide means, and the shank is provided at its lower end with abutment means to engage the stop means. When it is desired to remove the control rods from a fuel assembly, the mast is lowered until it rests on the top of the assembly. The shank is then lowered until its grapple connects with the head of the control rod bundle, and the latch means at the upper end of the shank is retracted. The shank is now raised by the hositing cable, and the retracted latch means clears the detent means so that the shank continues to move upward until its abutment means contacts the stop means. At this point the control rods have been retracted entirely within the guide means and thus within the working mast, and a major portion of the shank extends above the upper end of the working mast. Further raising of the shank raises the working mast up into the primary mast for transport.

A further feature of the construction is that the detent means and the latch means are so located on the mast and shank that when the latch means are in contact with the detent means the grapple at the lower end of the shank is a relatively short distance above the lower end of the working mast, the distance being in the range of about 5 percent to about 10 percent of the vertical height of the mast. This distance actually represents the approximate ratio of the length of the short orifice rods to the length of the working mast. When it is desired to remove orifice rods, the grapple is lowered to engage the rod bundle head while the latch means at the upper end of the shank is extended. The shank is raised until the latch means engages the detent means and at this point the orifice rods are fully retracted within the working mast. Consequently, the shank and mast may be raised while they are substantially coextensive and this saves approximately ninety percent of the time which would be required if the shank had to be raised as far as it would be with control rods. The hoisting speed must be extremely low to insure safety in handling nuclear components and thus the apparently small time saving for each unit involved adds up to a very significant time saving with the large total number of units in one reactor core.

An additional feature of the construction is that, with a suitably lengthened and shielded primary mast, a control rod bundle can be raised into the working mast which can then engage a fuel assembly, and the two components can then be raised separately but simultaneously into the primary mast. They can then be transferred together to another selected location where the fuel assembly may be deposited while the rod bundle is moved to some other location. In the absence of this capability it would be necessary to first remove the rod bundle, transfer it to the desired point, and then return the mast to the initial location, pick up the fuel assembly, and then move it to its new location. The time saving involved in even one operation of this kind is clearly very substantial.

BRIEF DESCRIPTION OF THE DRAWINGS

Various other advantages and features of novelty will become apparent as the description proceeds in conjunction with the accompanying drawings, in which:

FIG. 1 is a fragmentary schematic vertical section view of a reactor core and the apparatus of the invention operative to move a fuel assembly from a first location to a second location;

FIG. 4 is a veiw similar to FIG. 2 showing the apparatus connected to an orifice rod bundle for transport;

FIG. 5 is a veiw similar to FIG. 4 showing the apparatus at a second location;

FIG. 6 is a view similar to FIG. 3 showing a modification of the apparatus;

FIG. 7 is a fragmentary schematic elevational view showing a handling bridge and hoisting mechanism to which the apparatus is attached;

FIG. 8 is a schematic elevational view of a console for operating and monitoring the apparatus;

FIG. 9 is a fragmentary section view of a first portion of the length of the mast assembly;

FIG. 10 is a similar view of a second portion of the length of the same mast assembly;

FIG. 11 is a similar view of the lower end portion of the mast assembly; and

FIG. 12 is a schematic sectional view of the control rod grapple.

DESCRIPTION OF PREFERRED EMBODIMENTS

Figure 3:
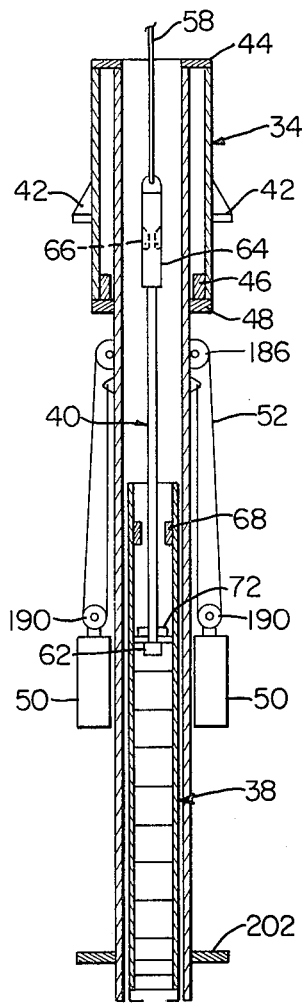
FIG. 3 is a veiw similar to FIG. 2 showing the apparatus at a second location.

The apparatus of the invention, together with the associated equipment, is schematically illustrated in FIG. 1, in which the reactor includes a massive structure 10, usually formed of reinforced concrete, having a deep pit 12 filled with water to a level close to the top of the structure, a core section 14, a transfer section 16, and a core wall 18 separating the two sections. Other areas not germane to the subject are not shown. A track 20 is mounted on the upper face 22 of the structure at each side of the pit to support a handling bridge. The latter includes a carriage 24 spanning the pit and provided with wheels 26 at each end to engage the tracks and enable movement of the carriage longitudinally of the tracks. A trolley 28 is provided with wheels 30 to ride on tracks (not shown) on the carriage for movement along the span of the carriage in a direction perpendicular to the direction of tracks 20. With suitable power and controls a selected support point on the bridge can be moved precisely to a location directly above any point in the pit, such as directly above a selected fuel assembly. The purpose of the bridge and associated apparatus is to raise, lower, and transport fuel assemblies and control rods separately or together from one location in the pit to another. For this purpose a telescoping mast assembly 32 is mounted on the bridge and depends therefrom into the pit.

The major components of the mast assembly comprises a supoprt mast 34, a primary mast 36, a working mast 38, and a control rod grapple shank 40. While the mast members may be formed of any suitable structure such as beams, channels, and the like, and may be arranged inside parallel relation or coaxial relation, it is preferred to make then rigid substantially cylindrical tubing and to arrange them one within the other in coaxial relation as shown. The support mast 34 is rigidly secured to the trolley by means of gussets 42. It is relatively short and extends down through the trolley and partly through the carriage. The primary mast 36 is the longest of the three and extends from the top of mast 34 down to a point about midway of the depth of the pit. It is mounted for rotation through a limited arc in the support mast by upper and lower bearings 44 and 46, and upward movement is prevented by stop block means 48 fixedly secured to the primary mast.

Working mast 38 is movable vertically throughout most of the length of the primary mast and is connected thereto by means of counterweight 50 and cables 52, the specific arrangement being outlined subsequently. The lower end 54 of the working mast is provided with a plurality of peripherally spaced pivoted gripper latches 56 which engage attachments on the upper end of a fuel assembly to raise, lower, and transport it.

Control rod grapple shank 40 is supported, and raised and lowered, by a hoisting cable 58 which is controlled by the mechanism described later in connection with FIG. 7. At its lower end 60 it is provided with a grapple 62 which is constructed for connection to the head of a control rod bundle. At its upper end 64 it is provided with extensible and retractable pivoted latch means 66 which in extended position engages detent means 68 fixedly secured to the inner wall of the working mast at its upper end 70. It will be noted that when the latch means is in engagement with the detent means the grapple 62 is located at a slight distance above the bottom of the working of the working mast. This distance is in the general range of about 5 percent to connected at its other end to the winch and wrapped on it. Appropriate control mechanism, not shown in detail, activates the motor and winch to raise and lower cable 58 as desired. Since the cable passes over sheave 100, the tension on the sheave is applied to the load indicating device which is operative to transmit signals representative of the cable tension load produced by the shank. Signal conductor means 106, 108 which are connected at their lower ends to movable parts of the mast assembly are wrapped on reels 110, 112 supported on cross member 96 and are connected by means, not shown, to suitable display and control means. An idealized representation of a control console 204 with numerical gauges, signal lights, and switches is illustrated in FIG. 8.

A more detailed showing of many of the working parts of the mast assembly is presented in FIGS. 9, 10, 11, and 12. FIG. 9 shows the lower portion of the working mast in elevated position within the primary mast and supporting the fuel assembly within the lower portion of the primary mast. FIG. 10 shows the upper portion of the working mast in the same elevated position. FIG. 11 is similar to FIG. 9 but shows the working mast in its lower position with the grapple supporting the orifice rod bundle within the lower portion of the working mast. FIG. 12 shows the detail of the grapple mechanism.

Considering FIGS. 10 and 11 together, the control rod guide means into which the control bundle is drawn comprises an upper plate 114 horizontally arranged and extending substantially across the interior of working mast 38, and a plurality of additional plates 116 parallel to and vertically spaced below plate 114. They are united to each other by being fixedly connected to a plurality of peripherally spaced axially extending bars 118, the lower ends of which are fixed to reinforcing ring 120 at the lower end of the working mast. The upper ends are provided with lockable adjusting screws 122 which center the guide means accurately and secure it in place. Plate 114 has a small central aperture 124 which is shaped to correspond with the fluted cross section of grapple 62 and provide a sliding fit. Plates 116 are also centrally apertured at 126 and in part conform to the fluted cross section of grapple 62 so that the grapple cannot rotate with respect to the working mast as it travels axially. In addition the apertures at 126 are shaped to conform to the spider-like contour of the control rod head 82 with a close but free fit so that the plates will prevent lateral displacement of the control rods during transport and prevent damage.

Latches 56, as seen in FIG. 9, are mounted on pivots 128 in annular mounting ring 130 forming the lowermost portion of the working mast to enter the apertures in flange 76 on the top of the fuel assembly for raising and transporting it. Their tips 132 are turned up slightly to serve as detents and prevent displacement of the latches while they are supporting the load. Actuating means for the latches include cam slots 134 in the latches, cam-engaging pins 136 to travel in the slots, and actuator rods 138 to which the pins are attached. The rods extend axially to the upper end of the rod guide means, sliding in apertures in plates 116 and 114.

Turning to FIG. 10, a central, axially extending tubular support 140 is mounted on the upper side of plate 114. A fluid pressure servo motor 142 surrounds the support and includes a piston member 144 fixed to the support and a cylinder member 146 surrounding and slidably mounted on the piston member and supplied by conduit means 148. The actuator rods 138 are secured to a flange 150 on the cylinder member by nuts 152 and are raised and lowered by virtue of the connection. The cylinder member is in the down position which lowers the rods as seen in FIG. 9 so that pins 136 are at the bottoms of slots 134, moving the latches 56 to active position.

It will be seen in FIG. 10 that latches 66 are pivotally mounted by pivots 154 on the upper end of the grapple shank and are extended into engagement with detent means 68 by linkage 156 actuated by servo motor 158 to raise the shank and the working mast in unison substantially coextensive relation, the components being shown in their upper position with the fuel assembly drawn into the primary mast. When latches 66 are retracted it is apparent that they will clear the detent means and the grapple shank can be raised with respect to the working mast when control rods are to be transported.

The stop means 72 in the form of a collar is fixedly secured on the upper end of support 140 and its bore serves as a bearing through which shank 40 slides. When the grapple is connected to the head of the control rod bundle and the shank is raised to such an extent that the rods are fully withdrawn into the rod guide means and the working mast, the grapple has reached the broken line position shown in FIG. 10 and its upper end serves as an abutment to contact stop means 72. Further upward movement of the shank draws the working mast up into the primary mast as previously described.

The manner of connecting grapple 62 to the neck 84 of control rod head 82 is schematically illustrated in FIG. 12. The neck is provided with a bore or socket 160 which is formed near its outer end with an annular groove 162. The grapple has an axial downward extension 164 having a coaxial passage 166 which extends upward through the grapple body and the shank 40. Locking balls 168 are mounted in radial pockets 170, and an actuating shaft 172 slidable mounted in passage 166 is provided near its lower end with a conical cam surface 174. When the shaft is moved downward the cam surface forces the balls outward into the annular groove 162 and they lock the grapple to neck 84. When the shaft is raised the balls retract and release neck 84. Shaft 172 emerges near the upper end of grapple shank 40, as seen in FIG. 10, and is connected to servo motor 176 to be operated thereby.

The head 90 of the orifice rod bundle does not have an upstanding neck like that of control rod head 82 but is basically a flat plate as can be seen in FIG. 11, having the same type of socket and annular groove as the neck 84, and it is engaged and disengaged in the same manner as decribed just above. When it is desired to pick up an orifice rod bundle the working mast is lowered onto a fuel assembly in the same way as in the other modes. Latches 66 remain extended and the shank is lowered until grapple 62 engages and is locked onto head 90 as seen in FIG. 11. The shank is then raised until latches 66 again engage detent means 68. Because of the short length of the orifice rods and the absence of an upstanding neck on head 90 such movement brings the orifice rods entirely within the working mast. When the shank is raised further, the working mast rises with it in unison and in substantially coextensive relation. Since the gap in which the orifice rods are located is only about 5 percent to about 10 percent of the vertical length of the working mast it is obvious that considerabout 10 percent of the vertical length of the working mast and conforms in any given case to the approximate ratio of the vertical lengths of the orifice rod bundle and the working mast.

In addition, stop means 72 is fixedly mounted in the upper portion of the working mast extending across its mid portion. Grapple 62 is of substantially greater lateral extent than shank 40 and serves to define abutment means adapted to engage stop means 72 when the shank moves upward through the mast.

A first function of the mast assembly is illustrated in FIG. 1, in which a plurality of fuel assemblies 74 are mounted on the floor of core section 14 in upright position and in parallel lateral adjacency. Each assembly comprises a plurality of parallel tubular members secured together and adapted to receive the various types of rods, and each is provided at its upper end with an upstanding flange 76 apertured to transported a fuel assembly the working mast, supported by shank 40 through the engagement of latch means 66 with detent means 68, is lowered until it rests on the upper end of the selected fuel assembly as shown, and latches 56 are activated to engage in the apertures in flange 76. The shank, and with it the working mast is substantially coextensive relation, is now raised until the working mast rises into the upper mid portion of the primary mast and the fuel assembly rises into the lower portion of the primary mast where it is protected from damage. The entire assembly is now above the level of the core wall and is transported to a position over transfer section 16, as illustrated, or to a storage or other section as desired. The working mast is then lowered until the fuel assembly comes to rest supported in its desired location and latches 56 are activated to release them from flange 76, completing the operation.

Figure 2:
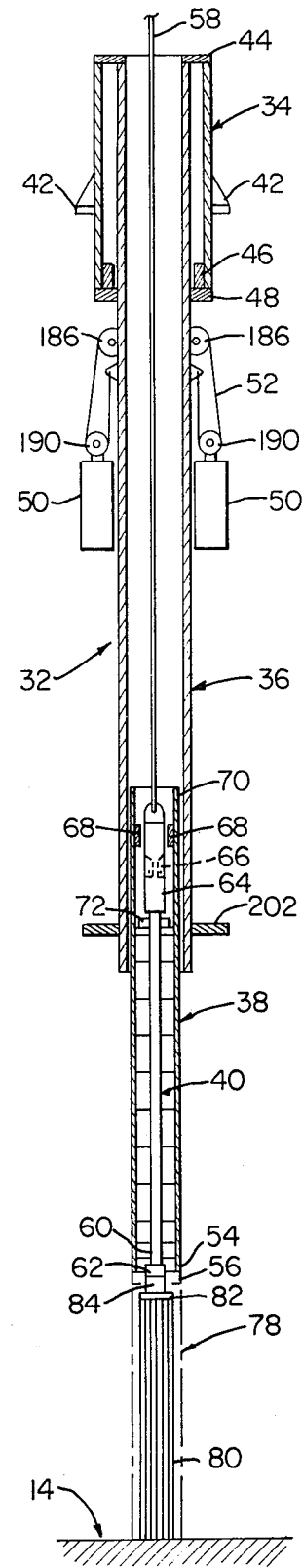
FIG. 2 is a schematic vertical sectional view of the apparatus connected to a control rod bundle for transport.

Another function of the mast assembly is illustrated in FIGS. 2 and 3, in which a control rod bundle 78 is shown, in FIG. 2, in place in a fuel assembly indicated in broken lines. The bundle includes a plurality of control rods (or poison or shaping rods) 80 secured to a control rod head 82 having an upwardly extending neck 84 with a central bore, not shown, defining a socket. The working mast has been lowered to rest on the fuel assembly and the shank is lowered until grapple 62 engages and connects to head 82 by way of neck 84. Latches 66 are retracted to clear detent means 68 and the shank is raised until the major portion of its length extends above the working mast, pulling the entire bundle 78 up into the mast for protection. At this point grapple 62 engages stop means 72 and further upward movement of the shank draws the working mast up into the primary mast as indicated in FIG. 3. The bundle may now be transported to any desired and deposited in a chosen support by reversing the steps just described.

The function of handling orifice rods is illustrated in FIGS. 4 and 5, in which an orifice rod bundle 86 is shown, in FIG. 4, in place in a fuel assembly indicated in broken lines. The bundle includes a plurality of orifice rods 88 secured to a head 90 which does not have an upwardly extending neck like neck 84 on the control rod head, and the engagement socket for the grapple is formed directly in the plate-like head. It will be noted that the orifice rods are extremely short compared to the control rods, and a great deal of valuable time would be wasted if they were raised and transported in the same fashion. This is avoided by the present construction in which, as mentioned above, grapple 62 is a short distance above the bottom of mast 38 when latches 66 are engaged with stop means 68. Actually, this distance is equal to or slightly more than the height of the orifice rods.

The first step of the operation, as before, is to lower mast 38 down onto the fuel assembly. Leaving latches 66 extended, the shank is lowered until the grapple contacts and attaches to head 90. The shank is then raised until latches 66 again engage detent means 68. At this point the bundle has been drawn entirely into the mast, and the shank and the mast are in substantially coextensive relation. They are then raised together to the position of FIG. 5 and the bundle is transported to the desired location and deposited by reversing the above steps. The minimal withdrawal and depositing movements result in very substantial time savings.

The mast assembly of FIG. 6 is substantially the same as in the previous figures but the primary mast is longer and the pit and the water are deeper. The purpose of this modification is to reduce the operational movements required when a control rod bundle is to be removed and transported to one location and the fuel assembly is to be lifted and transported to a different location. The customary practice is to move a first mast assembly into position, pick up the rod bundle, and transport it to the desired location, and the to move a second mast assembly into position, pick up the fuel assembly, and transfer it to some other location. Even with the apparatus described above, if the rod bundle and the fuel assembly are picked up and transported individually and separately with the same mast assembly, two full round trips are necessary.

This difficulty is overcome by the construction shown in FIG. 6 in which primary mast 92 is substantially longer than mast 36 of the previous figures. When it is desired to separate the rod bundle from the fuel assembly and transport them to different locations, the primary mast is lowered into contact with the fuel assembly as before. Grapple shank 40 is then lowered with latches 66 retracted until grapple 62 engages and connects with the head of the rod bundle, after which it is raised until the grapple engages stop means 72. The latches 56 are then actuated to connect them to flange 76, and the shank is raised to withdrawn the fuel assembly into the lower portion of primary mast 92 while the rod bundle is separated and located entirely above the fuel assembly but still well below the surface of the protective water.

The mast assembly is first moved to the location for deposit of the fuel assembly and the grapple shank is then lowered until the fuel assembly rests on its support. Latches 56 are disengaged and the mast assembly is moved directly to the location for deposit of the rod bundle. The grapple shank is then lowered again until the rod bundle is resting on its support and the grapple is disengaged from it. The mast assembly is now ready for transport to any desired location for subsequent operations.

The hoisting and load indicating features are schematically illustrated in FIG. 7, in which a tower 94 is mounted directly over the mast assembly. A cross member 96 at the upper end of the tower supports a load indicating device 98 which in turn supports a cable sheave 100. A hoist motot 102 and associated winch 104 are mounted on trolley 28. The hoist cable 58, which has one end connected to the control rod grapple shank 40, passes up and over sheave 100 and is able time is saved by eliminating the need to raise the shank the greater distance required for the control rods.

It is essential to retain the exact rotational relation between the primary mast, the working mast, and the grapple shank (a condition of no relative rotation) in order to insure that the grapple engages the rod bundle head at the proper angle of rotation so that the spider-like head will be exactly aligned with the corresponding apertures in plates 116 and pass through them without interference. The rotational relation of the shank to the working mast is insured by the keying of the fluted grapple body in the plate apertures. The rotational relation of the working mast to the primary mast is insured by the provision of key 178 extending axially along the outer wall of the working mast and guide means carried by the primary mast.

To maintain the working mast coaxial with the primary mast and minimize drag, there are provided several, preferably three, sets of vertically spaced guide rollers, each set being spaced peripherally around the primary mast. The rollers are mounted in the wall of the primary mast and extend inward to contact the working mast. Two such rollers of one set are shown in FIGS. 9 and 11 and identified as 180 and are located at an intermediate point and at the lower end, respectively, of the primary mast. There may be as many as a half dozen vertically spaced guide rollers in each set.

To provide the key guide means mentioned above, the two rollers 180 shown in FIGS. 9 and 11 are each provided on their working faces with annular grooves 182 which straddle and engage key 178 and prevent relative rotation between masts 36 and 38. The rollers are mounted in and held in position by brackets 184.

In order to properly connect the counterweight 50 to mast 38, a plurality of cable guide pulleys 186 and cable anchors 188 are connected to the primary mast 36 at points spaced about its periphery and above the counterweight 50, which is in the form of an annulus surrounding the primary mast and movable vertically therealong. A corresponding plurality of cable sheaves 190 are connected by brackets 192 to the counterweight. The cable 52 for each of these sets has a first end connected to bracket 194 on the wall of the working mast and it passes up and over cable guide pulley 186, down to and under cable sheave 190, and thence up to cable anchor 188, and its second end is connected to the cable anchor. The mechanical advantage of this system results in the counterweight traveling vertically half the distance that mast 38 travels in the opposite direction. The mass of the counterweight is chosen to reduce the effective weight of the working mast in contact with the upper end of the fuel assembly by a substantial amount, preferably more than 50 percent.

Since the counterweight is very heavy and could rotate some angular distance around the primary mast like a torsion pendulum and possibly cause some damage, a key 196 extends axially along the outer wall of the primary mast and slidingly engages keyway 198 formed in the inner wall of the counterweight. Brackets 184 extend out from the wall of mast 36 and the counterweight is accordingly provided with a plurality of recesses 200 to clear them as it travels vertically. A guard ring 202 surrounds mast 36 near its lower end to prevent a damaging fall of the counterweight in the event of failure of cables 52. These cables are fastened to brackets 194 at an intermediate point well down the length of mast 38 to enable its upper end to extend up above pulleys 186 in the extreme upper working position shown in FIG. 10.

It is to be understood that all of the necessary power means, signal means, and control means are provided in the apparatus but not all are illustrated or described since they are accessory to the present invention. One signaling means which is shown in FIG. 10 comprises upper and lower contact means 206 mounted on the inner wall of mast 38 and conductor means 208. The arm 210 is secured to servo motor cylinder 146 and moves with it to contact the upper or lower contact means 206 to indicate the inactive or active position of latches 56, the signal being transmitted by some one of the conductor means 106, 108 to the top of tower 94 and thence to console 204.

Various other indicator devices not shown in detail produce signals for transmission to the console, including device 98 which signals the loads in cable 58. The signals produce visual indications on the console, particularly of overload and underload, and usually are arranged to cut the power when abnormal conditions occur. Various rotary switches are connected to winch 104 to signal the grapple shank level and cut off power or actuate other control means as required.

It will be apparent that the apparatus disclosed above and shown in the drawings is compact, rugged, and relatively simple, and that its operation as described above results in valuable time savings in the handling of nuclear fuel assemblies and accessories.

What is claimed is:
1. Handling apparatus for use in combination with a handling bridge to raise, lower, and transfer nuclear fuel assemblies and accessories, comprising:
   a primary mast formed at its upper end for vertically fixed connection to a handling bridge to depend vertically therefrom;
   a working mast connected to the primary mast in parallel relation and axially movable with respect thereto;
   gripper latches on the lower end of the working mast movable from inoperative position to operative position to engage attachments on the upper end of a fuel assembly;
   control rod guide means fixed to the working mast to receive and guide control rods withdrawn from a fuel assembly;
   a control rod grapple shank arranged in parallelism with the working mast and axially movable with respect thereto and having a grapple at its lower end for connection to the head of a control rod bundle;
   hoisting means connected to the shank to raise and lower it with and with respect to the working mast;
   fixed detent means on the upper end of the working mast;
   and latch means on the upper end of the shank movable between inoperative position to clear the detent means and permit the shank to rise independently of the working mast through a predetermined distance and operative position to engage the detent means and raise the working mast in unison with the shank and in substantially coextensive relation therewith.
2. Apparatus as claimed in claim 1; in which
   the fixed detent means and the latch means are so located on the working mast and the shank that when the latch means is engaged with the detent means the extreme upper ends of the shank and the mast are at substantially the same level and the extreme lower end of the shank including the grapple is a relatively short distance above the extreme lower end of the mast.

3. Apparatus as claimed in claim 2; in which the distance is in the range of 5 to 10 percent of the vertical height of the working mast.

4. Apparatus as claimed in claim 1; further including stop means fixedly connected to the upper portion of the working mast below the detent means;
the lower end of the grapple shank being provided with abutment means to engage the stop means during upward movement of the shank and raise the working mast in unison with the shank and with the major portion of the length of the shank extending above the upper end of the working mast.

5. Apparatus as claimed in claim 4; in which the stop means comprises a collar connected to the upper end of the control rod guide means;
and the grapple shank is slidably guided in the collar.

6. Apparatus as claimed in claim 4; in which the grapple at the lower end of the shank includes a main body of greater lateral extent than the shank;
and the upper end of the body defines the abutment means.

7. Apparatus as claimed in claim 1; further including counterweight means supported by the primary mast and connected to the working mast to move vertically in opposition thereto and reduce the effective weight of the working mast in contact with the upper end of a fuel assembly.

8. Apparatus as claimed in claim 7; further including at least one cable guide pulley and cable anchor connected to the primary mast above the counterweight means;
at least one cable sheave connected to the counterweight means;
and at least one cable having a first end connected to the working mast and passing up over the cable guide pulley, down to and under the cable sheave, and thence up to the cable anchor, its second end being connected to the cable anchor.

9. Apparatus as claimed in claim 1; including
a cylindrical support connected to the upper end of the control rod guide means and extending coaxially therewith;
a fluid pressure servo motor mounted concentrically around the support and having an axially movable portion;
and actuating rods connected to the movable portion and extending to the gripper latches to move them between operative and inoperative positions.

10. Apparatus as claimed in claim 1; in which
the grapple comprises a main body, the lower end of which has a downwardly directed axial extension of reduced diameter to fit into an axial socket in the head of a control rod bundle;
radial pockets in the extension containing locking balls;
a passage extending axially through the grapple shank and the grapple;
an actuating shaft mounted in the passage and formed at its lower end to force the locking balls outwardly into an annular groove in the socket upon axial movement of the shaft;
and a fluid pressure servo motor connected to the upper end of the shaft and to the upper portion of the grapple shank to raise and lower the actuating shaft.

11. Apparatus as claimed in claim 1; further including
a hanlding bridge;
the primary mast being connected to the bridge and supported thereby;
a hoist motor and winch on the bridge;
a tower on the bridge extending above the primary mast;
a load indicating device suspended from the upper portion of the tower;
a cable sheave depending from the load indicating device;
the hoisting means comprising a cable connected at one end to the control rod grapple shank and extending up and over the cable sheave on the indicating device and wrapped on the winch to raise and lower the grapple shank;
and conductor means leading from the load indicating device to a display board to portray the tension load of the grapple shank on the load indicator device.

12. Handling apparatus for use in combination with a handling bridge to raise, lower, and transfer nuclear fuel assemblies and accessories, comprising:
a primary mast in the general form of a hollow column provided at its upper end with means for vertically fixed connection to a handling bridge to depend vertically therefrom;
a working mast in the general form of a hollow column arranged substantially concentrically within the primary mast and mounted for vertical axial movement within the primary mast;
gripper latches on the lower end of the working mast movable from inoperative to operative position to engage attachments on the upper end of a fuel assembly and support it for transfer movements;
control rod guide means arranged within the working mast and secured thereto to receive and guide control rods withdrawn from a fuel assembly;
a control rod grapple shank arranged substantially concentrically within the working mast and axially movable with respect thereto and having a grapple at its lower end for connection to the head of a control rod bundle to support the bundle for transfer movements;
hoisting means connected to the shank to raise and lower it with and with respect to the working mast;
fixed detent means on the upper end of the working mast;
and latch means on the upper end of the shank movable between inoperative position to clear the detent means and permit the shank to rise independently of the working mast through a predetermined distance and operative position to engage the detent means and raise the working mast in unison with the shank and in substantially coextensive relation therewith.

13. Apparatus as claimed in claim 12; in which
the fixed detent means and the latch means are so located on the working mast and the shank that when the latch means is engaged with the detent means the lower end of the shank including the grapple is located a relatively short distance above the lower end of the mast.

14. Apparatus as claimed in claim 13; in which
the distance is in the range of about 5 percent to about 10 percent of the vertical height of the working mast.

15. Apparatus as claimed in claim 12; further including
stop means fixedly mounted within the upper portion of the working mast below the detent means;
the lower end of the grapple shank being provided with abutment means to engage the stop means during upward movement of the shank and raise the working mast in unison with the shank and with the major portion of the length of the shank extending above the upper end of the working mast.

16. Apparatus as claimed in claim 15; in which
the stop means comprises a collar connected to the upper end of the control rod guide means and has an axial bore constituting a guide bearing;
and the grapple shank is slidably guided in the bearing.

17. Apparatus as claimed in claim 16; in which
the grapple at the lower end of the shank includes a main body of greater lateral extent than the shank;
and the upper end of the body defines the abutment means.

18. Apparatus as claimed in claim 12; further including
counterweight means surrounding and supported by the primary mast for vertical movement therealong and connected to the working mast to move in opposing vertical directions and reduce the effective weight of the mast in contact with the upper end of a fuel assembly.

19. Apparatus as claimed in claim 18; in which
the mass of the counterweight means is sufficient to reduce the effective weight of the mast by more than 50 percent.

20. Apparatus as claimed in claim 18; further including
a plurality of cable guide pulleys and cable anchors connected to the primary mast at points spaced about its periphery and above the counterweight means;
a corresponding plurality of cable sheaves connected to the counterweight means;
and a corresponding plurality of cables each having a first end connected to the working mast and passing up and over a corresponding cable guide pulley, down to and under a corresponding cable sheave, and thence up to a corresponding cable anchor, the second end of each cable being connected to its corresponding cable anchor.

21. Apparatus as claimed in claim 20; in which
the cable guide pulleys are mounted in the upper portions of the walls of the primary mast;
and the first ends of the cables are connected to the working mast at points intermediate its length to enable the upper end of the mast to extend above the cable guide pulleys when it is raised to its maximum working level.

22. Apparatus as claimed in claim 12; including
a central support member connected to the upper end of the control rod guide means and extending coaxially therewith;
a fluid pressure servo motor mounted concentrically around the support member and having an axially movable portion;
and actuating rods connected to the movable portion and extending to the gripper latches to move them between operative and inoperative positions.

23. Apparatus as claimed in claim 12; in which
the grapple comprises a main body, the lower end of which has a downwardly directed axial extension of reduced diameter to fit into an axial socket in the head of a control rod bundle;
radial pockets in the extension containing locking balls;
a passage extending axially through the grapple shank and the grapple;
an actuating shaft slidably mounted in the passage and formed at its lower end to force the locking balls outwardly into an annular groove in the socket upon axial movement of the shaft;
and a fluid pressure servo motor connected to the upper end of the shaft and to the upper portion of the grapple shank to raise and lower the actuating shaft.

24. Apparatus as claimed in claim 12; further including
a handling bridge;
the primary mast being connected to the bridge and supported thereby;
a hoist motor and winch on the bridge;
a load indicating device mounted on the bridge above the primary mast;
a cable sheave depending from the load indicating device;
the hoisting means comprising a cable connected at one end to the control rod grapple shank and extending up and over the cable sheave and wrapped on the winch to raise and lower the shank;
and the load indicating device being operative to transmit signals representative of the cable tension load produced by the shank.

25. Apparatus as claimed in claim 12; in which
the control rod guide means comprise a plurality of vertically spaced horizontally arranged plates extending substantially across the interior of the working mast and fixedly secured to each other and to the mast;
the plates being apertured to closely but freely receive the control rod head and the rods attached thereto and prevent substantial lateral displacement as they are raised into and lowered from the working mast.

26. Apparatus as claimed in claim 12; in which
the primary mast and the working mast comprise rigid substantially cylindrical tubes;
and guide rollers are mounted in the wall of the primary mast to contact and guide axial movement of the working mast;
the guide rollers comprising a plurality of sets of vertically spaced rollers;
each set being arranged in one of a plurality of vertical planes spaced about the periphery of the primary mast to maintain coaxial relation of the masts.

27. Apparatus as claimed in claim 26; in which
an axially extending key is provided along the length of the outer wall of the working mast;
and the rollers in one of the sets are formed with annular grooves in their working faces to engage the key and prevent relative rotation of the masts.

* * * * *

UNITED STATES PATENT OFFICE
CERTIFICATE OF CORRECTION

Patent No. 3,990,591                           Dated November 9, 1976

Inventor(s) Jerald R. Street, et al

It is certified that error appears in the above-identified patent and that said Letters Patent are hereby corrected as shown below:

Column 2, line 55, "hositing" should read -- hoisting --.

Column 3, lines 48, 50, and 52, "veiw" should read -- view --.

Column 4, line 67, "of the working" should be deleted.

Column 5, line 18, after "apertured to", insert -- receive latches 56 of the working mast. When it is desired to transport --; same line 18, delete "transported".

Column 5, line 24 "mast is" should read -- mast in --.

Column 5, line 53, after "desired" insert -- location --.

Column 6, line 45, "withdrawn" should read -- withdraw --.

Column 6, line 65, "hoist motot" should read -- hoist motor --.

Column 8, line 12, after "unison" insert -- in --.

Column 12, line 7 "hanlding bridge" should read -- handling bridge --.

Signed and Sealed this

Fifth Day of April 1977

[SEAL]

Attest:

RUTH C. MASON
*Attesting Officer*

C. MARSHALL DANN
*Commissioner of Patents and Trademarks*